W. H. NOSWORTHY & S. J. PRESCOTT.
HYDROAEROPLANE.
APPLICATION FILED JUNE 11, 1914.
1,122,531. Patented Dec. 29, 1914.
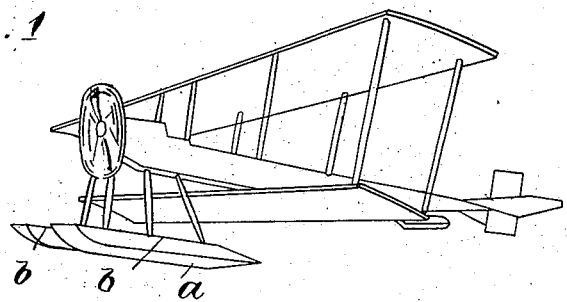
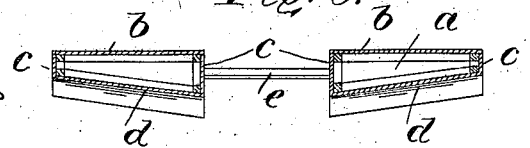
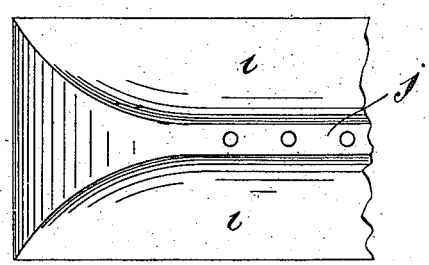
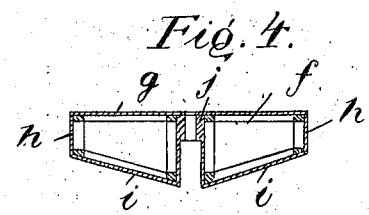
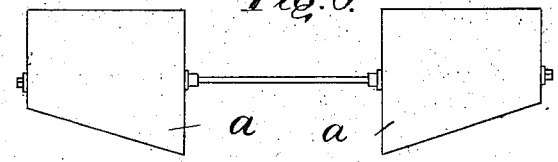
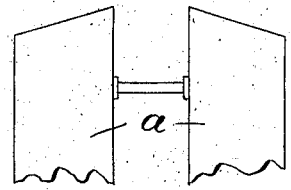

UNITED STATES PATENT OFFICE.

WILLIAM HENRY NOSWORTHY AND SAMUEL JAMES PRESCOTT, OF LONDON, ENGLAND.

HYDROAEROPLANE.

1,122,531.  Specification of Letters Patent.  Patented Dec. 29, 1914.

Application filed June 11, 1914. Serial No. 844,508.

*To all whom it may concern:*

Be it known that we, WILLIAM HENRY NOSWORTHY and SAMUEL JAMES PRESCOTT, subjects of His Majesty the King of England, residing at London, England, have invented certain new and useful Improvements in Hydroaeroplanes, of which the following is a specification.

This invention relates to water plane floats forming part of vehicles intended mainly for air, but adapted to rest on water, or to make moderate progress on water, and has for its principal object to modify or reduce the lift resisting effect of what is commonly called the suction of the water on such floats, and at the same time to realize a maximum lateral stability of the machine when water borne and a progressive contact from the center outwardly of the floats when the machine is alighting on the water.

By and in accordance with this invention separation of a water plane float from the water is materially facilitated by substituting for the present usual one-sided horizontal flat bottom or under surface of a float body, a one-sided under surface which inclines from the horizontal in the lateral direction as a continuous or non-stepped slope whereby independently of vertical tilting of the float in rising, the area over which the suction or cohesion and adhesion of the water is effective, is gradually or progressively diminished as the float rises; there being a gradual flow off of the water from the bottom, due to the inclined formation thereof, throughout the lift. In carrying out the invention the float is constituted as a pair of spaced landing float bodies, each of said float bodies having a flat one-sided bottom inclined to the horizontal, said bottom surfaces when produced to intersect forming a dihedral angle with the vertex directed downwardly. Thus hypothesizing a lift without any vertical tilting of the float, separation is gradually effected whereas with flat bottom floats separation is sudden from over the whole area simultaneously. Also a maximum lateral stability of the machine when water borne is realized and a progressive contact of the floats from the facing sides outwardly when the machine is alighting on the water is derived.

The invention may be conveniently and advantageously carried out as shown in the accompanying drawings in which:—

Figure 1 is a perspective view of a water or hydro-aeroplane illustrating an abreast combination of a pair of floats according to this invention applied thereto. Fig. 2 a side elevation of such an abreast combination of floats. Fig. 3 is a sectional view of Fig. 2 this showing rather a divided boat-like float than a combination of twin-boat-like floats. Fig. 4 is a transverse section of a modified form of float under the invention. Fig. 5 is an under plane view of the forward or prow portion of the float according to Fig. 4. Fig. 6 is a back elevation of an abreast combination of a pair of floats according to Figs. 1, 2, and 3. Fig. 7 is a front elevation of a variant abreast combination of a pair of floats under the invention. Fig. 8 is a plan view of a preferred pointing off of the stern ends of the floats.

Referring to Figs. 1 to 3 and 6, *a* designates a float body comprising braced spars covered with fabric or sheet aluminium or the like, and constructed with a horizontal upper surface *b*, vertical sides *c c*, and an under surface *d* which is inclined to the horizontal in the lateral direction; thereby forming a lateral tapering float body having a single or one sided inclined bottom. As illustrated, such a float body will be combined with a generally similar float body to form an abreast combination which as a whole conforms to the aspect of a divided boat rather than twin boats with the inclined under surfaces diverging in the upward direction, and with an appropriate separation giving the desired stability to the float unit thereby formed. Connection of a pair of float bodies as an abreast combination may conveniently and advantageously be effected by transverse members *e*.

The prow and stern portions of the floats will ordinarily be rounded off in the illustrated approved manner, and in rising from the water it will be readily understood that in virtue of the inclined under surfaces of the floats, the "suction" or cohesion and adhesion of the water is gradually or progressively diminished as the float rises; the flow off of the water from the bottoms of the float being gradual owing to the lateral inclination whereby the force required to overcome the effect of "suction" is considerably reduced. Pointing off of the rounded stern end of float such as depicted in Fig. 8 further acts desirably in giving a gradual release; the contact areas finally reducing to a point.

In realizing a float having the aforesaid characteristic of diminishing the "suction" effect of the water in rising, the float is formed as depicted so as, in a substantial measure, to make them sustaining planes for self support when in the air, whereby the flying qualities of the machine are promoted. In this direction also the upwardly diverging inclined surfaces of the abreast combination of floats constitute dihedral sustaining surfaces tending to promote stability of the machine in the air, and also on the water, and realize a progressive contact from the facing sides outwardly when alighting on the water.

As a variant application of the invention or as a construction which may be employed as a single float the arrangement according to Fig. 4 may be adopted. In this arrangement the float consists of a double laterally tapered body $f$ having an upper horizontal surface $g$, vertical sides $h$ $h$, and under inclined surfaces $i$ which diverge in the upward direction. It is to be observed that the hereinbefore described abreast combination makes its own keel thereby giving stability on the water. Fig. 4 illustrates a modified float under the invention suitable as a tail float. This is similar to that previously described except that there is less separation between the float bodies and the connection is by an apertured framing $j$ whereby the longitudinal spacing is vented to the atmosphere. This longitudinal spacing is also preferably provided with a flared entrance at the curved prow of the boat (see Fig. 5) in order to promote the passage of air through the vents during the linear travel of the float along the water to thereby facilitate such travel. As before described with reference to the abreast combination illustrated by Figs. 1, 2, 3 and 6 the float according to Fig. 4 has a form such as to render it effective as a sustaining plane for self support when in the air.

As an illustration that the invention is capable of realization without a specially constructed float the arrangement according to Fig. 7 may be considered appropriate. According to this arrangement an abreast combination of a pair of ordinary non-laterally tapering float bodies is made so that each element of the combination inclines to the horizontal in the lateral direction and in combination forms substantially the equivalent of the abreast combination depicted by Figs. 1, 2, 3 and 6.

A similar equivalent of the float construction depicted by Fig. 4 may be obviously realized by a pair of non-laterally tapering float bodies.

Treatment of the floats by coating with a material having a low affinity for water will promote separation and as a definite or good resistant element shellac may be mentioned; this being a resinous substance which absorbs little or no water. Separation will also be facilitated when the coating is of a hydrocarbon, fatty, or greasy nature, such a separating agent being conveniently supplied as required as by a system of exudatory glands, pores or the like; there being apertures connected with a pipe supply system.

Having thus described our invention what we claim and desire to secure by Letters Patent is:—

In a hydro-aeroplane, a pair of spaced landing float bodies, each of said float bodies having a flat one-sided bottom inclined to the horizontal, said bottom surfaces when produced to intersect forming a dihedral angle with the vertex directed downwardly.

In testimony whereof we affix our signatures in presence of two witnesses.

WILLIAM HENRY NOSWORTHY.
SAMUEL JAMES PRESCOTT.

Witnesses:
ARTHUR DREICHLINGER,
ALBERT GEORGE BARNES.